United States Patent
Hsiao et al.

(10) Patent No.: US 8,901,762 B2
(45) Date of Patent: Dec. 2, 2014

(54) WIND POWER GENERATING SYSTEM AND METHOD FOR CONTROLLING THE SAME

(75) Inventors: Chih-Hung Hsiao, Taoyuan Hsien (TW); Cheng-Chieh Chan, Taoyuan Hsien (TW); Yun-Chi Hung, Taoyuan Hsien (TW)

(73) Assignee: Delta Electronics, Inc., Taoyuan Hsien (TW)

( * ) Notice: Subject to any disclaimer, the term of this patent is extended or adjusted under 35 U.S.C. 154(b) by 225 days.

(21) Appl. No.: 13/546,416

(22) Filed: Jul. 11, 2012

(65) Prior Publication Data
US 2013/0161950 A1    Jun. 27, 2013

(30) Foreign Application Priority Data
Dec. 26, 2011 (TW) .............................. 100148529 A (51) Int. Cl.
*F03D 9/00* (2006.01)

(52) U.S. Cl.
USPC .......................................................... 290/44

(58) Field of Classification Search
USPC .............. 290/44, 55; 415/1, 2.1, 4.5; 416/1, 7
See application file for complete search history.

(56) References Cited

U.S. PATENT DOCUMENTS

| 8,212,373 B2 * | 7/2012 | Wittekind et al. ............ 290/44 |
| 2010/0007145 A1 | 1/2010 | Calley |
| 2010/0295305 A1 * | 11/2010 | Mahawili ..................... 290/44 |
| 2012/0091714 A1 * | 4/2012 | Wittekind et al. ............ 290/44 |

FOREIGN PATENT DOCUMENTS

| CN | 101581272 A | 11/2009 |
| JP | 2003-97414 A | 4/2003 |
| JP | 2004-304889 A | 10/2004 |
| JP | 2007-336760 A | 12/2007 |

* cited by examiner

*Primary Examiner* — Jean Duverne
(74) *Attorney, Agent, or Firm* — Muncy, Geissler, Olds & Lowe, P.C.

(57) ABSTRACT

A control method for a wind power generating system includes the following procedures. When a rotational speed control condition is satisfied, a wind turbine is switched to operate under a rotational speed control mode to limit the electricity power by a maximum power point shifting manner. When a speed of an external wind is greater than a predetermined wind speed, the wind turbine is switched to operate under a safety mode to decrease a rotational speed of the wind turbine by a maximum torque extraction manner to protect the wind power generating system. A wind power generating system is also disclosed herein.

19 Claims, 5 Drawing Sheets

WIND POWER GENERATING SYSTEM AND METHOD FOR CONTROLLING THE SAME

RELATED APPLICATIONS

This application claims priority to Taiwan Patent Application Serial Number 100148529, filed Dec. 26, 2011, which is herein incorporated by reference.

BACKGROUND

1. Technical Field

The present disclosure relates to a power generating system and control method thereof, and more particularly, to a wind power generating system and control method thereof.

2. Description of Related Art

Recently, with rising awareness about environmental protection, technologies of renewable energies are developed rapidly. In various kinds of renewable evergies, a wind power generation is a simple manner of generating power without pollution. The wind power generation is performed by using a natural wind (i.e., an external wind) to drive fan blades of a wind turbine to transform the external wind into an electricity power, to provide sufficient power for a load (e.g., a battery or a transmission network).

However, when a speed of the external wind increases, a rotational speed of the fan blades of the wind turbine also increases, such that the electricity power generated by the wind turbine may exceed a tolerable range of the load, resulting in breakdowns of instruments of a wind power generating system. Furthermore, when the speed of the external wind is too high, the wind turbine itself may not afford too high rotational speed and thus may be out of control or be damaged.

As known in the prior art, when the speed of the external wind is too high, a protection mechanism of the wind turbine is performed when three phase outputs of an electric generator are short-circuited by electronic devices to utilize a torque of the electric generator to decrease the rotational speed of the fan blades and the electric generator to a lowest rotational speed. For example, a relay or a circuit breaker is activated with an electric control manner or a manual manner to short-circuit the three phase outputs of the electric generator. But, when the wind turbine operates at a high rotational speed, if a maximum torque produced by short-circuiting the three phase outputs is directly used to instantly stop the wind turbine, the fan blades and the electric generator tend to be damaged easily.

Hence, the conventional skill still has the aforementioned shortcomings and defficiencies desired to be overcome.

SUMMARY

The following presents a simplified summary of the disclosure in order to provide a basic understanding to the reader. This summary is not an extensive overview of the disclosure and it does not identify key/critical elements of the present disclosure or delineate the scope of the present disclosure. Its sole purpose is to present some concepts disclosed herein in a simplified form as a prelude to the more detailed description that is presented later.

An aspect of the present disclosure provides a wind power generating system and a control method thereof, in which the wind power generating system at least includes a wind turbine, a control unit, and a load unit. The control method includes following procedures. First, the control unit is activated to determine an operation mode of the wind turbine. Subsequently, the wind turbine is set to operate under a normal mode, such that the wind turbine generates an electricity power according to a maximum power extraction curve. Next, whether a rotational speed control condition is satisfied is determined, and if so, the wind turbine is switched from operating under the normal mode to operating under a rotational speed control mode to limit the electricity power outputted from the wind turbine by a maximum power point shifting manner. After that, whether a speed of an external wind speed is greater than a predetermined wind speed is determined, and if so, the wind turbine is switched from operating under the rotational speed control mode to operating under a safety mode to decrease a rotational speed of the wind turbine by a maximum torque extraction manner to protect the wind power generating system.

In one embodiment of the present disclosure, the control method further includes the steps described below. Whether the speed of the external wind is still greater than the predetermined wind speed is detected in an unit time, and if so, the wind turbine is maintained operating under the safety mode.

In one embodiment of the present disclosure, the rotational speed control condition includes a condition that the electricity power generated by the wind turbine exceeds a tolerable range for an electricity power of the load unit.

In one embodiment of the present disclosure, the rotational speed control condition includes a condition that the rotational speed of the wind turbine exceeds a predetermined safe rotational speed.

In one embodiment of the present disclosure, the rotational speed control condition includes a condition that an extraction current of the wind turbine is greater than a tolerable range for a current of a winding.

In one embodiment of the present disclosure, the rotational speed control condition includes a condition that a condition that a magnitude of noise generated by the wind turbine is greater than a predetermined threshold value.

In one embodiment of the present disclosure, when the wind turbine operates under the safety mode, the wind turbine is operated at a low speed.

In one embodiment of the present disclosure, the electricity power generated by the wind turbine is distributed to the load unit and a brake unit by the control unit.

In one embodiment of the present disclosure, the rotational speed control condition comprises at least one of conditions that the electricity power generated by the wind turbine exceeds a tolerable range for an electricity power of the load unit, the rotational speed of the wind turbine is greater than a predetermined safe rotational speed, an extraction current of the wind turbine exceeds a tolerable range for a current of a winding, and a magnitude of noise generated by the wind turbine is greater than a predetermined threshold value.

In one embodiment of the present disclosure, the method further includes generating a control signal by the control unit to adjust a switching period of a brake unit for controlling the rotational speed of the wind turbine.

Another aspect of the present disclosure provides a wind power generating system and the wind power generating system includes a wind turbine, a control unit, and a load unit. The wind turbine includes a blade module and an electric generator, in which the blade module is actuated by an external wind to drive the electric generator to generate electricity power. The control unit is electrically coupled with the wind turbine and for configuring the wind turbine to operate under one of a normal mode, a rotational speed control mode and a safety mode according to a rotational speed, an output power, an extraction current, and a noise of the wind turbine and an intensity of the external wind. The load unit is electrically coupled with the control unit and configured to receive the electricity power generated by the wind turbine.

In one embodiment of the present disclosure, the wind power generating system further includes a brake unit. The brake unit is electrically coupled with the wind turbine and the control unit, and the brake unit is configured to receive the electricity power distributed by the control unit to adjust the electricity power transmitted from the wind turbine to the load unit.

In one embodiment of the present disclosure, the wind power generating system further includes a brake unit. The brake unit is electrically coupled with the wind turbine and the control unit, and the brake unit is configured to receive a control signal generated by the control unit such that a switching period of the brake unit is adjusted to control the rotational speed of the wind turbine.

In one embodiment of the present disclosure, the control unit is configured to control the wind turbine to operate under the normal mode, and the wind turbine generates the electricity power under the normal mode according to a maximum power extraction curve.

In one embodiment of the present disclosure, the control unit is configured to switch the wind turbine from operating under the normal mode to operating under the rotational speed control mode according to a rotational speed control condition of the wind turbine, such that the electricity power outputted from the wind turbine is limited in a predetermined range. The rotational speed control condition may include at least one of conditions that the electricity power generated by the wind turbine exceeds a tolerable range for an electricity power of the load unit, the rotational speed of the wind turbine is greater than a predetermined safe rotational speed, an extraction current of the wind turbine exceeds a tolerable range for a current of a winding, and a magnitude of noise generated by the wind turbine is greater than a predetermined threshold value.

In one embodiment of the present disclosure, wind power generating system includes a brake unit. The brake unit is electrically coupled with the wind turbine and the control unit, and the brake unit is configured to receive a control signal generated by the control unit, in which under the rotational speed control mode, a switching period of the brake unit is adjusted according to the control signal to control the rotational speed of the wind turbine.

In one embodiment of the present disclosure, the control unit is configured to switch the wind turbine from operating under the rotational speed control mode to operating under the safety mode when a speed of the external wind is greater than a predetermined wind speed.

In one embodiment of the present disclosure, the control unit is configured to determine whether a speed of the external wind is greater than a predetermined wind speed and configured to slowly decrease the rotational speed of the wind turbine to a relatively low rotational speed when the speed of the external wind is greater than the predetermined wind speed.

In one embodiment of the present disclosure, the control unit is configured to maintain the wind turbine operating under the safety mode when a speed of the external wind is greater than a predetermined wind speed in unit time.

In one embodiment of the present disclosure, the control unit is configured to switch the wind turbine from operating under the normal mode to the rotational speed control mode when a rotational speed control condition of the wind turbine is satisfied, and the control unit is configured to to slowly decrease the rotational speed of the wind turbine to a relatively low rotational speed when a speed of the external wind is greater than a predetermined wind speed, wherein the rotational speed control condition comprises at least one of conditions that the electricity power generated by the wind turbine exceeds a tolerable range for an electricity power of the load unit, the rotational speed of the wind turbine is greater than a predetermined safe rotational speed, an extraction current of the wind turbine exceeds a tolerable range for a current of a winding, and a magnitude of noise generated by the wind turbine is greater than a predetermined threshold value.

Hence, the technologies of the above aspects of the present disclosure may improve shortcomings and deficiencies of the prior art.

BRIEF DESCRIPTION OF THE DRAWINGS

The present disclosure can be more fully understood by reading the following detailed description of the embodiments, with reference made to the accompanying drawings as follows.

DETAILED DESCRIPTION

In the following detailed description, for purposes of explanation, numerous specific details are set forth in order to attain a thorough understanding of the disclosed embodiments. It will be apparent, however, that one or more embodiments may be practiced without these specific details. In other instances, well-known structures and devices are schematically shown in order to simplify the drawing.

As used in the description herein and throughout the claims that follow, the meaning of "a," "an," and "the" includes reference to the plural unless the context clearly dictates otherwise. Also, as used in the description herein and throughout the claims that follow, the terms "comprise or comprising," "include or including," "have or having," "contain or containing" and the like are to be understood to be open-ended, i.e., to mean including but not limited to. As used in the description herein and throughout the claims that follow, the meaning of "in" includes "in" and "on" unless the context clearly dictates otherwise.

It will be understood that, although the terms "first," "second," etc., may be used herein to describe various elements, these elements should not be limited by these terms. These terms are only used to distinguish one element from another.

For example, a first element could be termed a second element, and, similarly, a second element could be termed a first element, without departing from the scope of the embodiments. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Figure 1:
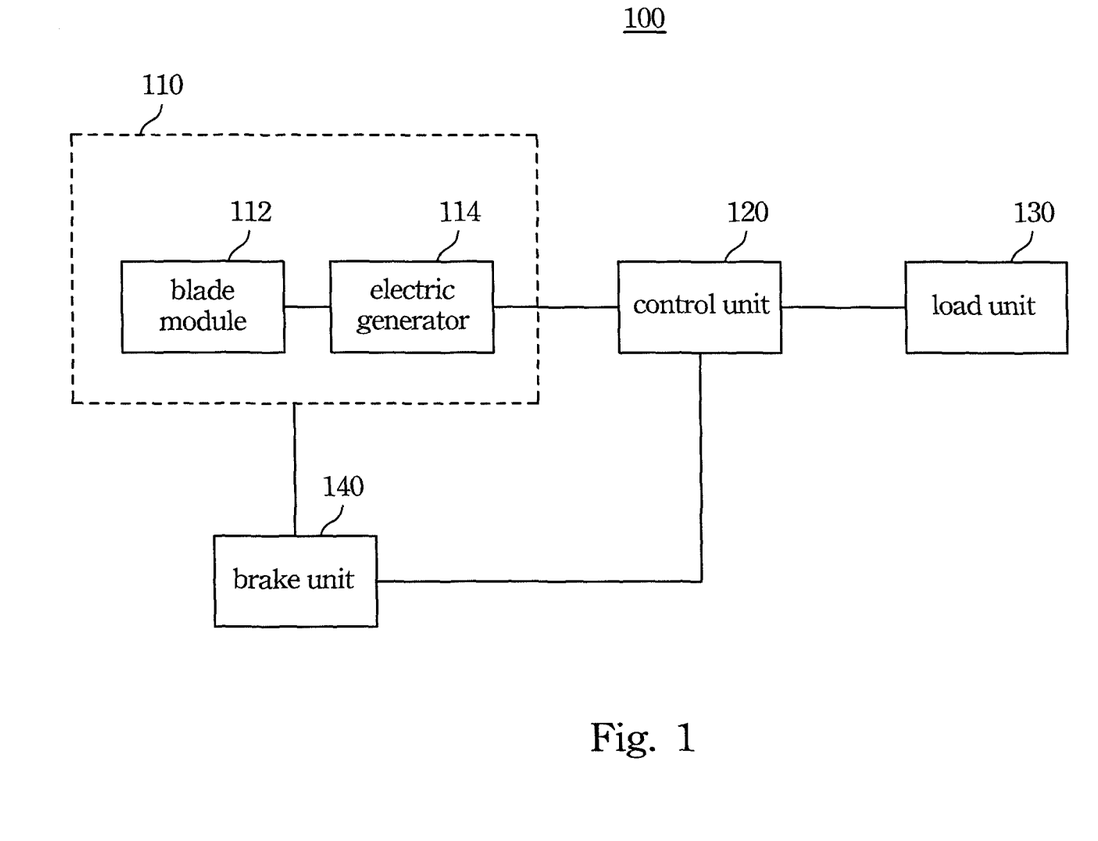
FIG. 1 is a circuit block diagram of a wind power generating system according to an embodiment of the present disclosure.
Figure 2:
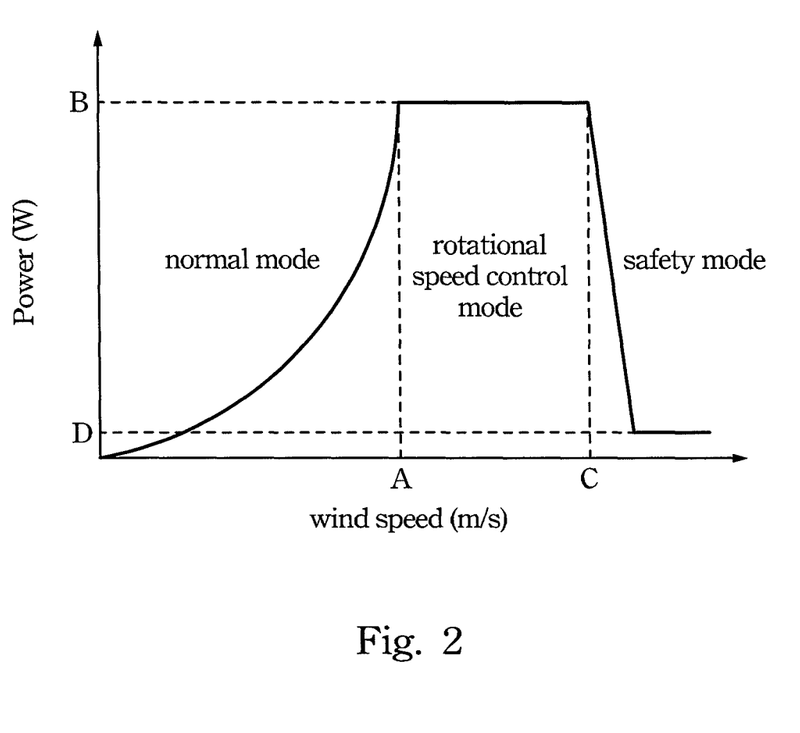
FIG. 2 is a diagram showing an output power of a wind turbine which operates under a normal mode, a rotational speed control mode and a safety mode in an embodiment of the present disclosure.

FIG. 1 is a circuit block diagram of a wind power generating system according to an embodiment of the present disclosure. The wind power generating system 100 may include a wind turbine 110, a control unit 120, and a load unit 130. The wind turbine 110 may include a blade module 112 and an electric generator 114, in which the blade module 112 is actuated by an external wind to drive the electric generator 114 to generate an electricity power. The control unit 120 is electrically coupled with the wind turbine 110 (alternatively, directly or indirectly coupled with the electric generator 114) and for configuring the wind turbine 110 to operate under one of a normal mode, a rotational speed control mode and a safety mode, as shown in FIG. 2, according to a rotational speed, an output power, an extraction current, and a noise of the wind turbine 110 and an intensity of the external wind, to limit the rotational speed and the output power of the wind turbine 110 in a safety range. FIG. 2 is a diagram showing an output power of the wind turbine which operates under the normal mode, the rotational speed control mode and the safety mode in an embodiment of the present disclosure.

The load unit 130 is electrically coupled with the control unit 120 and configured to receive the electricity power generated by the wind turbine 110. In the present embodiment, the load unit 130 may include a power transmission grid and a power storage unit (e.g., a battery,); however, the configuration of the wind power generating system 100 is not limited thereto.

Illustratively, in the present embodiment, the blade module 112 may include a plurality of fan blades. When the fan blades are actuated by the external wind to produce a torque, the blade module 112 is driven by the torque to rotate and to drive the electric generator 114 through a transmission device (not shown), so as to generate the electricity power.

In one embodiment of the present disclosure, the wind power generating system 100 may further include a brake unit 140. The brake unit 140 is electrically coupled with the wind turbine 110 and the control unit 120, and the brake unit 140 is configured to receive the electricity power distributed by the control unit 120 to adjust the electricity power transmitted from the wind turbine 110 to the load unit 130. On the other hand, the brake unit 140 may further receive a control signal generated by the control unit 120 such that a switching period of the brake unit 140 is adjusted by the control signal to control the rotational speed of the wind turbine 110.

Referring to FIG. 1 and FIG. 2, when a speed of the external wind is smaller than the wind speed (e.g., 12 m/s) at point A, the wind turbine 110 operates under the normal mode. At that moment, the wind turbine 110 generates the electricity power according to a maximum power extraction curve, such that the wind turbine 110 outputs a maximum power at each corresponding wind speed.

When the speed of the external wind is greater than the wind speed at point A but smaller than the wind speed (e.g., 18 m/s) at point C, or when a rotational speed control condition is satisfied, the control unit 120 controls the wind turbine 110 to switch from operating under the normal mode to operating under the rotational speed control mode to limit the electricity power outputted from the wind turbine 110 by a maximum power point shifting manner and controls the rotational speed of the wind turbine 110. Illustratively, under the rotational speed control mode, the control unit 120 controls the wind turbine 110 to generate the electricity power according to a shift of the maximum power extraction curve rather than according to the maximum power extraction curve. Additionally, the control unit 120 may distribute the redundant electricity power generated by the wind turbine 110 to the brake unit 140, to adjust the electricity power received by the load unit 130. Furthermore, the control unit 120 may further provide the control signal to the brake unit 140. The switching period of the brake unit 140 is adjusted by the control signal, so as to control the rotational speed of the wind turbine 110. Hence, under the rotational speed control mode, when the speed of the external wind increases, the rotational speed of the wind turbine 110 still can be maintained in a safe rotational speed range to provide a constant output power, as shown at point B in FIG. 2.

When the speed of the external wind is greater than the wind speed at point C, the rotational speed of the wind turbine 110 is unable to be controlled under the foregoing rotational speed control mode, such that the rotational speed of the wind turbine 110 may be out of control or the wind turbine 110 may be damaged. At that moment, the control unit 120 may switch the wind turbine 110 from operating under the rotational speed control mode to operating under the safety mode, and the rotational speed of the wind turbine 110 is decreased to a low rotational speed by a maximum torque extraction manner. Hence, the wind turbine 110 is driven to operate at the low rotational speed, such that the output power of the wind turbine 110 operated under the safety mode is substantially maintained at a low output power, as shown at point D in FIG. 2, in order to protect the wind power generating system 100 and its normal operation.

Figure 3:
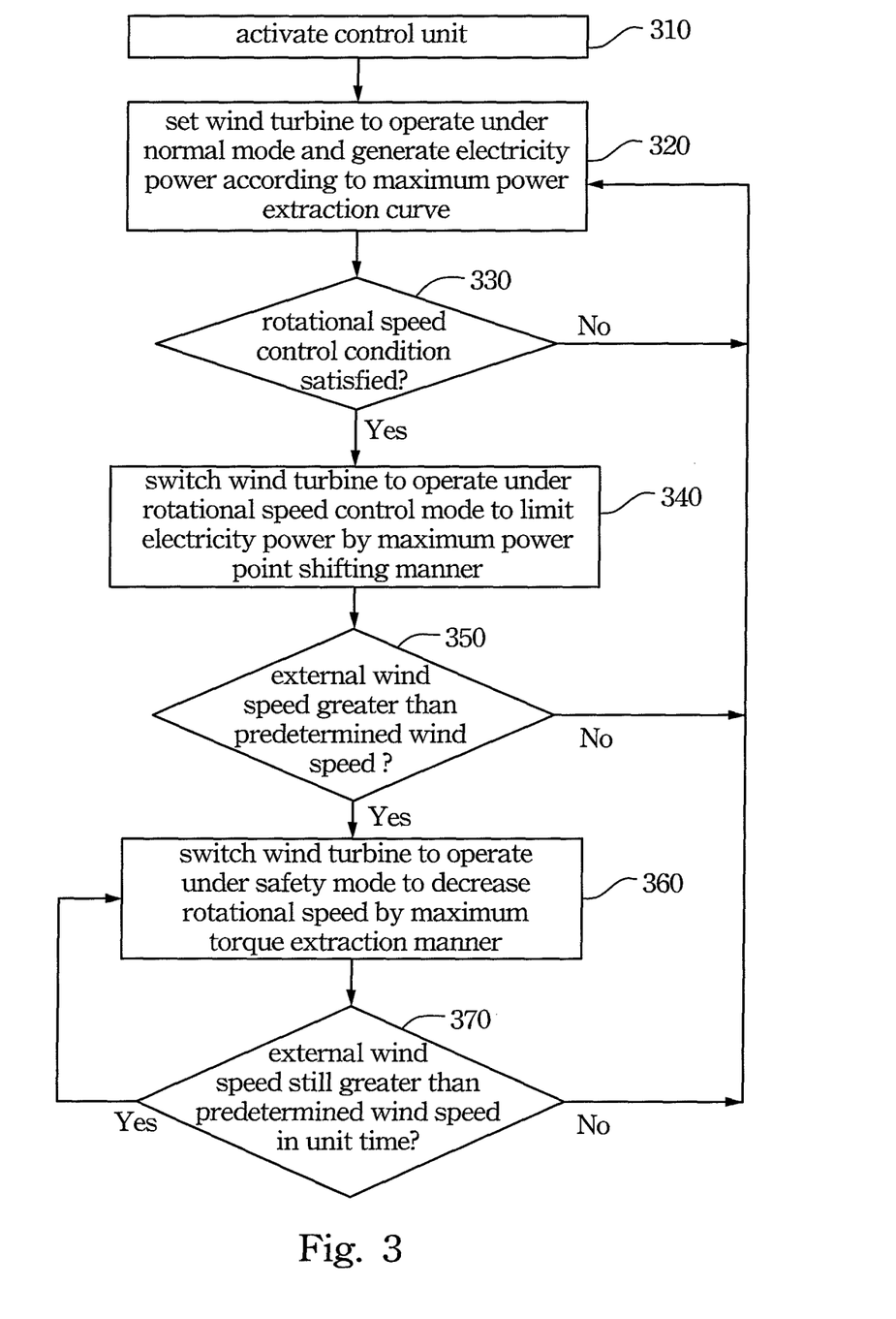
FIG. 3 is a flow chart of a control method of the wind power generating system according to an embodiment of the present disclosure.
Figure 4:
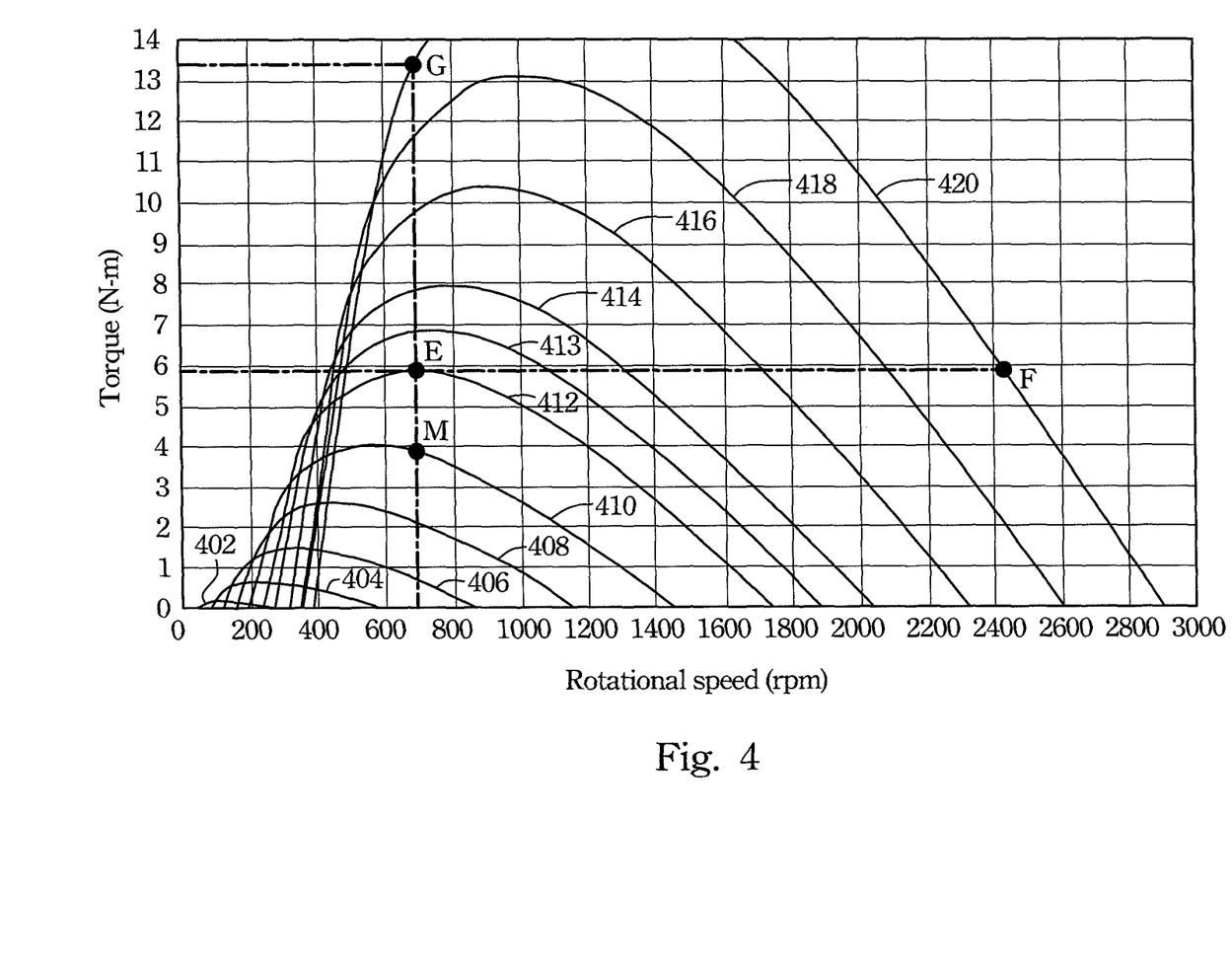
FIG. 4 is a plot of the torque versus the rotational speed when the wind turbine operates according to a maximum power extraction manner at each wind speed in an embodiment of the present disclosure.

FIG. 3 is a flow chart of a control method of a wind power generating system according to an embodiment of the present disclosure. The control method may be applied in the wind power generating system 100 shown in FIG. 1, but is not limited. The structure of the mechanism is identical or similar to the foregoing embodiment and is thus not described again. Referring to FIG. 1 and FIG. 3, first, in step 310, the control unit 120 is activated to determine an operation mode of the wind turbine 110. Subsequently, in step 320, the wind turbine 110 is set to operate under the normal mode, such that the wind turbine 110 generates the electricity power according to a maximum power extraction curve. Illustratively, under the normal mode, the rotational speed of the blade module 112 increases as the speed of the external wind increases, such that the electricity power generated by the electric generator 114 also increases. Additionally, the maximum power extraction curve indicates the state of the maximum output power generated when the electric generator 114 coordinates with the blade module 112 at each corresponding wind speed, such that the wind turbine 110 outputs the maximum power at each corresponding wind speed.

Next, in step 330, the control unit 120 may determine whether the rotational speed control condition is satisfied. For example, the rotational speed control condition may include at least one of the conditions that the electricity power generated by the wind turbine 110 exceeds a tolerable range for an electricity power (e.g., 100 MW) of the load unit 130, the rotational speed of the wind turbine 110 is greater than a predetermined safe rotational speed (e.g., 1200 rpm,) an extraction current of the wind turbine 110 exceeds a tolerable range for a current (e.g., 30 A) of a winding, and a magnitude of noise (e.g., mechanical noise or aero-acoustic noise) generated by the wind turbine 110 is greater than a predetermined threshold value (e.g., 75 dB). When the rotational speed control condition is satisfied, step 340 is performed, and the wind turbine 110 is switched from operating under the normal mode to operating under the rotational speed control mode to limit the electricity power outputted from the wind turbine 110 in a safety range by the maximum power point shifting manner, such that at least one of the situations that the electricity power generated by the wind turbine 110 falls within the tolerable range for the electricity power of the load unit 130, the rotational speed of the wind turbine 110 is smaller than the predetermined safe rotational speed, the extraction current of the wind turbine 110 falls within the tolerable range for the current of the winding, and the magnitude of noise generated by the wind turbine 110 is smaller than the predetermined threshold value, is satisfied. When the rotational speed control condition is not satisfied, the operation is back to the step 320. Furthermore, the electricity power generated by the wind turbine 110 can be distributed to the load unit 130 and the brake unit 140 by the control unit 120 to adjust the electricity power received by the load unit 130 in a tolerable range.

After that, in step 350, the control unit 120 may determine whether the speed of the external wind is greater than a predetermined wind speed (e.g., 18 m/s.) If so, step 360 is performed, and the wind turbine 110 is switched from operating under the rotational speed control mode to operating under the safety mode to decrease the rotational speed of the wind turbine 110 by the maximum torque extraction manner to protect the wind power generating system 100. If not, the operation is back to the step 320.

In one embodiment of the present disclosure, the foregoing control method further includes the step 370 described below. In step 370, whether the speed of the external wind is still greater than the predetermined wind speed in an unit time is detected. If so, the step 360 is performed to maintain the wind turbine 110 operating under the safety mode. If not, the operation is back to the step 320.

For example, when a typhoon arrives, an instant wind speed is often greater than a maximum wind speed (e.g., 18 m/s) which the wind turbine 110 is able to tolerate. Hence, the control unit 120 may switch the wind turbine 110 to operate under the safety mode according to an average wind speed or the instant wind speed detected by the control unit 120 when the typhoon arrives. After that, the control unit 120 may detect whether the speed of the external wind is still greater than the predetermined wind speed in the unit time (e.g., 1 hour, 12 hours or 24 hours) in order to determine whether the typhoon leaves or not. For example, when the average speed of the external wind detected during 12 hours is smaller than the predetermined wind speed, which indicates the typhoon leaves, the operation is back to the step 320, and the wind turbine 110 is switched to operate under the normal mode.

Collectively referring to FIGS. 1-4, FIG. 4 is a plot of the torque versus the rotational speed when the wind turbine operates according to the maximum power extraction manner at each wind speed in an embodiment of the present disclosure. Curves 402-420 are referred to as the curves of the torque versus the rotational speed when the speed of the external wind increases from 2 m/s to 20 m/s, respectively. For example, a tolerable maximum torque of the wind turbine 110 may be 5.9 N-m and a predetermined safe rotational speed is below 1200 rpm. When the speed of the external wind is 10 m/s, the wind turbine 110 may be controlled to operate in a safety range in which the torque is 4 N-m and the rotational speed is 700 rpm, as shown at point M in FIG. 4. When the wind speed increases to 12 m/s, if the rotational speed of the wind turbine 110 is requiredly controlled to be 700 rpm, then a tolerable maximum torque of 5.9 N-m is achieved, as shown at point E in FIG. 4. When the wind speed increases to 20 m/s, if the rotational speed of the wind turbine 110 is requiredly controlled to be 700 rpm, then the torque of 13.5 N-m is achieved, as shown at point G in FIG. 4. At that moment, the torque exceeds the tolerable maximum torque of the wind turbine 110 and results in a damage of the wind turbine 110. Additionally, when the wind speed is 20 m/s, if the torque of the wind turbine 110 is controlled to be 5.9 N-m, then the rotational speed of 2400 rpm is achieved, as shown at point F in FIG. 4. At that moment, the rotational speed extremely exceeds the predetermined safe rotational speed of the wind turbine 110 and results in the damage of the wind turbine 110. Therefore, in the present embodiment, when the speed of the external wind is greater than 12 m/s, the wind turbine 110 has to be switched to operate under the rotational speed control mode or the safety mode, and the rotational speed and the torque of the wind turbine 110 is controlled in a safety range according to the maximum power point shifting manner or the maximum torque extraction manner, to maintain the normal operation of the wind power generating system 100.

Figure 5A:
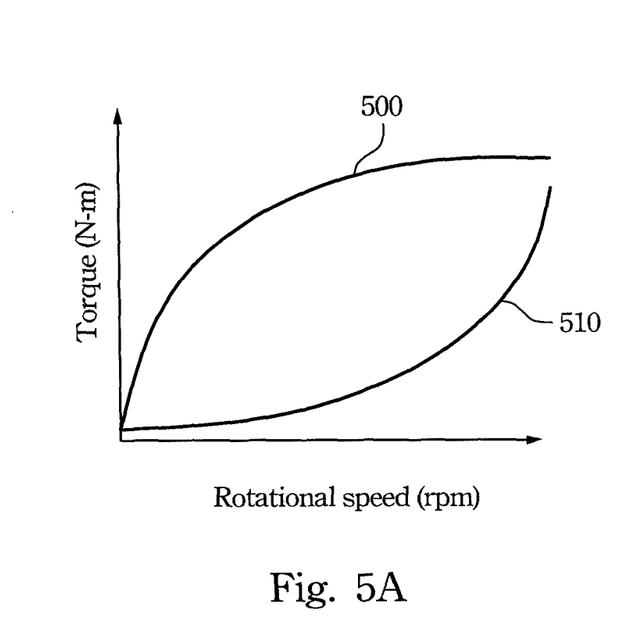
FIG. 5A is a plot of the torque versus the rotational speed when the wind turbine operates according to the maximum power extraction manner and a maximum torque extraction manner in one embodiment of the present disclosure.

FIG. 5A is a plot of the torque versus the rotational speed when the wind turbine operates according to the maximum power extraction manner and the maximum torque extraction manner in one embodiment of the present disclosure. Curve 500 is the curve of the torque versus the rotational speed when the wind turbine 110 operates according to the maximum torque extraction manner. Curve 510 is the curve of the torque versus the rotational speed when the speed of the external wind of the wind turbine 110 is 10 m/s and the wind turbine 110 operates according to the maximum power extraction manner. When the speed of the external wind is too high, the control unit 120 may set the wind turbine 110 to operate under the safety mode and may suppress the torque produced by the blade module 112 according to the maximum torque extraction manner, as shown by the curve 500, to slowly decrease the rotational speed of the wind turbine 110 to a low rotational speed. When the speed of the external wind is not too high, if the wind turbine 110 is set to operate under the safety mode, the rotational speed of the wind turbine 110 decreases to nearly zero m/s, as shown by an intersection of the curve 500 and the curve 510.

Figure 5B:
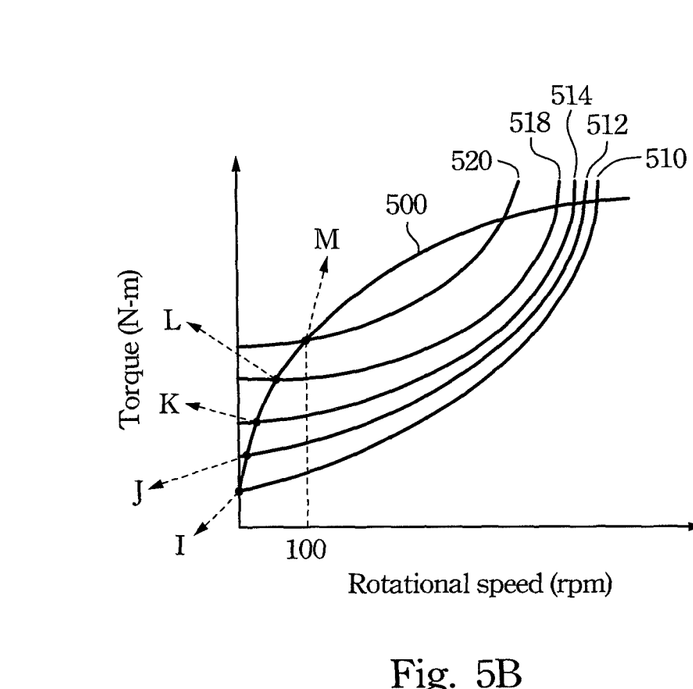
FIG. 5B is a plot of the torque versus the rotational speed when the wind turbine operates according to the maximum power extraction manner at each wind speed and according to the maximum torque extraction manner in one embodiment of the present disclosure.

FIG. 5B is a plot of the torque versus the rotational speed when the wind turbine operates according to the maximum power extraction manner at each wind speed and according to the maximum torque extraction manner in one embodiment of the present disclosure. Curve 500 is the curve of the torque versus the rotational speed when the wind turbine 110 operates according to the maximum torque extraction manner. Curves 510-520 are the curves of the torque versus the rotational speed when the wind turbine 110 operates according to the maximum power extraction manner and the speed of external wind increases from 10 m/s to 20m/s, respectively. For example, when the speed of the external wind is 12 m/s, the maximum torque extraction curve and the maximum power extraction curve are intersected at point J. Therefore, when the wind turbine 110 operates under the safety mode, the rotational speed of the wind turbine 110 operating according to the maximum torque extraction manner is about 20 rpm. When the speed of the external wind increases to be 20 m/s, the rotational speed of the wind turbine 110 operating according to the maximum torque extraction manner increases to be about 100 rpm, as shown at point M. Hence, in the present embodiment, the wind turbine 110 has an advantage of active control, and the damage caused when the wind turbine 110 is suddenly stopped at a high wind speed can be reduced.

Compared to the prior art, in the foregoing embodiments of the present disclosure, the control unit 120 can actively determine the operation mode of the wind turbine 110 according to the foregoing rotational speed control conditions and the intensity of the external wind, such that the wind turbine 110 may operate under the normal mode, the rotational speed control mode and the safety mode, respectively, to control the rotational speed and the output power of the wind turbine 110 according to the maximum power extraction manner, the maximum power point shifting manner and the maximum torque extraction manner, respectively, to maintain the normal operation of the wind power generating system 100.

All the features disclosed in this specification (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Any element in a claim that does not explicitly state "means for" performing a specified function, or "step for" performing a specific function, is not to be interpreted as a "means" or "step" clause as specified in 35 U.S.C. §112, 6th paragraph. In particular, the use of "step of" in the claims herein is not intended to invoke the provisions of 35 U.S.C. §112, 6th paragraph.

What is claimed is:

1. A control method for a wind power generating system, the wind power generating system at least comprising a wind turbine, a control unit, and a load unit, the control method comprising:
   activating the control unit to determine an operation mode of the wind turbine;
   setting the wind turbine to operate under a normal mode, such that the wind turbine generates an electricity power according to a maximum power extraction curve;
   determining whether a rotational speed control condition is satisfied, and if so, switching the wind turbine from operating under the normal mode to operating under a rotational speed control mode, so as to limit the electricity power outputted from the wind turbine by a maximum power point shifting manner, and controlling the wind turbine to generate the electricity power according to a shift of the maximum power extraction curve ; and
   determining whether a speed of an external wind is greater than a predetermined wind speed, and if so, switching the wind turbine from operating under the rotational speed control mode to operating under a safety mode, so as to decrease a rotational speed of the wind turbine by a maximum torque extraction manner to protect the wind power generating system.

2. The control method of claim 1, further comprising:
   detecting whether the speed of the external wind is still greater than the predetermined wind speed in unit time, and if so, maintaining the wind turbine operating under the safety mode.

3. The control method of claim 1, wherein the rotational speed control condition comprises a condition that the electricity power generated by the wind turbine exceeds a tolerable range for an electricity power of the load unit.

4. The control method of claim 1, wherein the rotational speed control condition comprises a condition that the rotational speed of the wind turbine is greater than a predetermined safe rotational speed.

5. The control method of claim 1, wherein the rotational speed control condition comprises a condition that an extraction current of the wind turbine exceeds a tolerable range for a current of a winding.

6. The control method of claim 1, wherein the rotational speed control condition comprises a condition that a magnitude of noise generated by the wind turbine is greater than a predetermined threshold value.

7. The control method of claim 1, wherein the electricity power generated by the wind turbine is distributed to the load unit and a brake unit by the control unit.

8. The control method of claim 1, wherein the rotational speed control condition comprises at least one of conditions that the electricity power generated by the wind turbine exceeds a tolerable range for an electricity power of the load unit, the rotational speed of the wind turbine is greater than a predetermined safe rotational speed, an extraction current of the wind turbine exceeds a tolerable range for a current of a winding, and a magnitude of noise generated by the wind turbine is greater than a predetermined threshold value.

9. The control method of claim 1, further comprising:
   generating a control signal by the control unit to adjust a switching period of a brake unit for controlling the rotational speed of the wind turbine.

10. A wind power generating system, comprising:
    a wind turbine comprising a blade module and an electric generator, wherein the blade module is actuated by an external wind to drive the electric generator to generate electricity power;
    a control unit electrically coupled with the wind turbine and for configuring the wind turbine to operate under one of a normal mode, a rotational speed control mode and a safety mode according to a rotational speed, an output power, an extraction current, and a noise of the wind turbine and an intensity of the external wind ; and
    a load unit electrically coupled with the control unit and configured to receive the electricity power generated by the wind turbine,
    wherein the control unit is configured to control the wind turbine to generate the electricity power under the normal mode according to a maximum power extraction curve,
    wherein the control unit is configured to control the wind turbine to generate the electricity power according to a shift of the maximum power extraction curve by a maximum power point shifting manner under the rotational speed control mode,
    wherein the control unit is configured to decrease the rotational speed of the wind turbine by a maximum torque extraction manner under the safety mode.

11. The wind power generating system of claim 10, further comprising:
    a brake unit electrically coupled with the wind turbine and the control unit, the brake unit configured to receive the electricity power distributed by the control unit to adjust the electricity power transmitted from the wind turbine to the load unit.

12. The wind power generating system of claim 10, further comprising:
    a brake unit electrically coupled with the wind turbine and the control unit, the brake unit configured to receive a control signal generated by the control unit, such that a switching period of the brake unit is adjusted to control the rotational speed of the wind turbine.

13. The wind power generating system of claim 10, wherein the control unit is configured to switch the wind turbine from operating under the normal mode to the rotational speed control mode according to a rotational speed control condition of the wind turbine, such that the electricity power outputted from the wind turbine is limited in a predetermined range.

14. The wind power generating system of claim 13, wherein the rotational speed control condition comprises at least one of conditions that the electricity power generated by the wind turbine exceeds a tolerable range for an electricity power of the load unit, the rotational speed of the wind turbine is greater than a predetermined safe rotational speed, an extraction current of the wind turbine exceeds a tolerable range for a current of a winding, and a magnitude of noise generated by the wind turbine is greater than a predetermined threshold value.

15. The wind power generating system of claim 13, further comprising:
a brake unit electrically coupled with the wind turbine and the control unit, the brake unit configured to receive a control signal generated by the control unit, wherein under the rotational speed control mode, a switching period of the brake unit is adjusted according to the control signal to control the rotational speed of the wind turbine.

16. The wind power generating system of claim 13, wherein the control unit is configured to switch the wind turbine from operating under the rotational speed control mode to operating under the safety mode when a speed of the external wind is greater than a predetermined wind speed.

17. The wind power generating system of claim 13, wherein the control unit is configured to determine whether a speed of the external wind is greater than a predetermined wind speed and configured to slowly decrease the rotational speed of the wind turbine to a relatively low rotational speed when the speed of the external wind is greater than the predetermined wind speed.

18. The wind power generating system of claim 10, wherein the control unit is configured to maintain the wind turbine operating under the safety mode when a speed of the external wind is greater than a predetermined wind speed in unit time.

19. The wind power generating system of claim 10, wherein the control unit is configured to switch the wind turbine from operating under the normal mode to the rotational speed control mode when a rotational speed control condition of the wind turbine is satisfied, and the control unit is configured to slowly decrease the rotational speed of the wind turbine to a relatively low rotational speed when a speed of the external wind is greater than a predetermined wind speed, wherein the rotational speed control condition comprises at least one of conditions that the electricity power generated by the wind turbine exceeds a tolerable range for an electricity power of the load unit, the rotational speed of the wind turbine is greater than a predetermined safe rotational speed, an extraction current of the wind turbine exceeds a tolerable range for a current of a winding, and a magnitude of noise generated by the wind turbine is greater than a predetermined threshold value.

\* \* \* \* \*